Patented Apr. 4, 1944

2,346,083

UNITED STATES PATENT OFFICE 2,346,083

POLY-DISPERSE SYSTEM

Jack D. Robinson and Frederick J. Myers, Philadelphia, Pa., assignors to The Resinous Products & Chemical Company, Philadelphia, Pa., a corporation of Delaware No Drawing. Application September 28, 1940, Serial No. 358,838

11 Claims. (Cl. 260—3)

This invention relates to poly-disperse systems in which there are in suspension in an aqueous medium particles containing rubber hydrocarbons and separate particles of a highly condensed and polymerized plastic composition obtained by reacting an oil-modified alkyd resin and an organic solvent-soluble carbamide-aldehyde-alcohol condensate. It further relates to the impregnating and coating of fibrous materials and fabrics with the said poly-disperse systems.

It has been found that aqueous suspensions containing both kinds of particles yield deposits possessing properties lacking or deficient in films of the individual components. Thus, a coating from a mixed dispersion of rubber hydrocarbon and of the insoluble reaction product of an oil-modified alkyd resin and a urea-formaldehyde-alcohol condensate will be flexible and tough even beyond the extent to be predicted from the components. At the same time the coating will be less tacky, possess improved gloss, present grease-resistance, and exhibit other desirable properties. Ageing properties of the films are greatly improved over rubber films.

The poly-disperse systems of this invention are obtained by mixing a suspension of rubber particles with a suspension of the insoluble reaction product of an oil-modified alkyd resin and carbamide-aldehyde-alcohol condensate. The two separate suspensions are first separately obtained or prepared and may be adjusted to desired solids contents within wide limits. It is, of course, essential that the nature of the two types of suspensions be such that they are compatible on being mixed. This requires, for example, similarity in ionic charge. Also, conditions of pH must be such that one suspension will not cause coagulation or precipitation of the other. This is particularly true of rubber dispersions in the form of latex, which are usually protected with an alkaline medium, such as an ammoniacal solution, and are coagulated with acid.

The aqueous dispersion of rubber hydrocarbons may be in the form of rubber latex, vulcanized rubber latex, or dispersed rubber hydrocarbon particles in suspension. The latex may be of the normal or usual concentration or of the concentrated type. As is known, latex particles are composed of rubber hydrocarbons, protein, and other materials. Similar but not identical dispersions may be prepared from coagulated or crude rubber as is known in the art, and from rubber hydrocarbons used in making so-called "synthetic rubber." Dispersions of rubber hydrocarbons are also obtainable from rubber in the reclaimed state.

The reaction product of an oil-modified alkyd-type resin and an organic solvent-soluble carbamide-aldehyde-alcohol condensate is prepared by mixing the resin and condensate and heating the mixture while it is worked mechanically. There results a non-reactive, converted plastic composition of limited thermoplasticity.

The alkyd resins which may be used are made from a polyhydric alcohol, such as glycerol, polyglycerol, ethylene glycol, polyethylene glycol, pentaerythritol, sorbitol, mannitol, or the like, a resin-forming dicarboxylic acid, such as phthalic, maleic, succinic, adipic, sebacic, etc., or a polybasic acid, such as citric, and a fatty acid or glyceride, such as lauric, myristic, stearic, oleic, ricinoleic, hydroxystearic, etc. acid, or comparable oil such as cocoanut, cottonseed, castor, etc. Mixtures of various members of these classes of ingredients may be used. There may also be used, particularly in mixtures with non-drying oils or fatty acids, such drying oils as sunflower, soya bean, hemp, linseed, or tung oil or the acids derived therefrom. A polyhydric alcohol, polycarboxylic acid and fatty acid or glyceride are heated together to give resins which are soluble in various organic solvents. This solubility is lost, however, when they are worked mechanically and simultaneously heated at elevated temperatures with 5% to 50% of their weight of a carbamide-aldehyde-alcohol condensate.

The carbamide-aldehyde-alcohol condensates may be prepared according to well known methods in which urea and formaldehyde are condensed with an alcohol in the presence of an acid catalyst. Water of reaction is removed by distillation, as with an azeotropic mixture of alcohol-benzene and water, or the water may be separated from refluxed solvent. Typical procedures are presented in U. S. Patents Nos. 2,019,865, issued November 5, 1935, and 2,171,882, issued September 5, 1939, etc. In conjunction with urea there may be used other carbamides, such as thiourea, dicyandiamide, alkyl- or phenyl-substituted ureas, triazines, such as melamine, etc. Likewise part of the formaldehyde may be replaced with higher aldehydes, such as acetaldehyde, butyraldehyde, benzaldehyde, etc. The useful alcohols include not only the commonly used ethyl, propyl, butyl, and amyl alcohols but also the higher aliphatic alcohols, such as octyl, dodecyl, cetyl, octadecyl, etc., which are most readily introduced by alcoholysis of a carbamide-aldehyde-lower alcohol condensate. There may also be used ether-alcohols, polyhydric alcohols, ester-alcohols, halohydrins, or other compounds which possess a reactive, available hydroxyl group.

The reaction product of an alkyd resin and urea-formaldehyde-alcohol condensate may be modified with such materials as hard resins (including natural resins, ester gums, oil-soluble phenol-formaldehyde condensates, maleic anhydride-rosin condensates, etc.), plasticizers (like butyl phthalate, tricresyl phosphate, blown castor oil, etc.), waxes (like carnauba, montan, paraffin, candelilla, etc.), metallic soaps, dyes, pigments, mineral fillers, etc. In general, the total of all such modifying agents constitutes less than half of the non-reactive plastic composition.

Further details of the preparation of the reaction product here used are given in U. S. Application Serial No. 287,698, filed August 1, 1939, which issued on August 18, 1942, as U. S. Patent 2,293,164. It is also there disclosed that the rubbery, converted plastic composition which is obtained by mechanical mixing and simultaneous heating between about 120° C. and about 180° C. may be mixed with dispersing agents and/or protective colloids and dispersed in aqueous medium. As dispersing agent, there may be used a fatty acid soap, particularly an amine soap such as triethanolamine oleate, a salt of a sulfated alcohol or a sulfonated ether or a sulfonated amide derivative. In conjunction therewith a protective colloid, such as casein, glue, a water-soluble cellulose ether (like methyl cellulose), a gum (like arabic, karaya or tragacanth), etc. is usually desirable. Cation-active dispersing agents, such as benzyl cetyl dimethyl ammonium chloride or octadecyloxymethyl dimethyl benzyl ammonium bromide, etc. may likewise be used provided the suspension of rubber hydrocarbons to be mixed therewith is also prepared with a cation-active agent.

The suspension of rubber hydrocarbons and the suspension of the plastic composition may be mixed in a wide range of proportions. In the application of the mixed dispersions to the coating of paper there may be used preparations, the solids content of which contains from 2 to 15 parts of rubber hydrocarbons for 98 to 85 parts of the plastic composition. Less than 2 parts of rubber hydrocarbons per 100 parts of total solids will not give an appreciable effect. With 5 and 10 parts of rubber hydrocarbons, grease-resistance is at a maximum without loss of other properties, while with more than 15 parts of rubber water-resistance falls off. When the poly-disperse system is applied to woven fabrics, etc., 15 to 40 parts of rubber hydrocarbons may be used with 85 to 60 parts of the plastic composition on a solids basis. The optimum effects as to gloss, flexibility, etc. are here obtained with 30 to 35 parts of rubber hydrocarbons to 70 to 65 parts of the plastic composition.

The following examples present details of the preparation of the highly condensed and non-reactive plastic compositions and their use with dispersions of rubber hydrocarbons.

Example 1

Five hundred parts of an alkyd resin having a 50% glycerol-phthalate content, prepared by heating glycerine, phthalic anhydride, cocoanut oil, and soya bean oil at 200°–210° C. until a homogeneous resin of low acid number was formed, was charged to a heated mixer and 400 parts of the reaction product of 500 parts of rosin, 67 parts of maleic anhydride, and 73 parts of glycerine, heated at 260° C. to an acid number of 35, was added followed by 130 parts of dibutyl phthalate. The mixture was kneaded at 140° C. for about one-half hour, the temperature then reduced, and 350 parts of a 50% urea-formaldehyde-butanol condensate in butanol added. The mixture was then worked and heated at 135° C. for an hour to produce a tough, rubbery mass. 120 parts of an aliphatic hydrocarbon solvent, boiling 150–200° C., was then incorporated and the mass cooled. There was then added a paste consisting of 75 parts of casein, 45 parts of triethanolamine oleate, 40 parts of concentrated ammonium hydroxide and 425 parts of water. After the paste had been thoroughly worked into the resin, the resulting mixture was cut with water containing a little ammonia to a 50% solids basis.

Sixty-seven parts of this dispersion was mechanically mixed with 33 parts of a concentrated latex having a solids content of 60%. The resulting poly-disperse system was applied by knifing on a sateen and dried. Three such applications gave a coating which embossed well, was tough, was flexible at 0° C., and which held a finishing lacquer coat tenaciously.

One hundred forty parts of the dispersion of the converted plastic composition as prepared above was mixed with 50 parts of a vulcanized latex having a solids content of 50%. The resulting dispersion was applied by roller-coating on a woven cotton fabric. The coating adhered exceptionally well, was tough and flexible, and resisted ageing under an ultraviolet lamp.

Example 2

There were charged to a heated, mechanical mixer 75 parts of tricresyl phosphate, 375 parts of an alkyd resin prepared from glycerine, phthalic anhydride and sebacic acid, 250 parts of the alkyd resin used in Example 1, prepared from glycerine, phthalic anhydride, cocoanut oil, and soya bean oil, 375 parts of the resin from rosin, maleic anhydride, and glycerine, also described in Example 1, and 60 parts of ethyl cellulose. This mixture was heated and worked until homogeneous. It was then cooled to about 90° C. and 250 parts of a 50% butanol solution of a urea-formaldehyde-octyl alcohol condensate added. The temperature was raised to 140° C. and the mixture worked until homogeneous. This mixture was worked on rubber rolls with a casein paste as in Example 1. It was then worked in a mechanical kneader and diluted with water containing a small amount of ammonia to give a dispersion containing 50% solids.

A mixture was prepared from 150 parts of this dispersion and 15 parts of a latex having a 30% solids content. The dispersion was applied to paper by roller-coating and the paper dried. The grease-resistance of this coated paper, as measured by time of penetration, was 48 hours against 500 seconds for paper coated with the unmodified dispersion of converted plastic material.

A mixture was prepared from 144 parts of the dispersion of the converted plastic composition and 12 parts of a vulcanized latex having a solids content of 63%. The resulting dispersion was applied to paper and dried. This coated paper had a grease-resistance of 2200 seconds against 500 seconds for paper coated with the unmodified dispersion of converted plastic material.

The poly-disperse systems which result from mixing a suspension or dispersion of rubber hydrocarbons and a suspension or dispersion of the plastic composition herein described are useful for impregnating and coating woven and felted fabrics. As coating compositions for cloth, they may be used as base coats for artificial leather and oil cloth. In this use they give an extremely good "build" on the fabric, in this respect exceeding with three coats the results of eight lacquer coats. The deposited films give improved adhesion to cloth and to top coats of lacquer. Mixed dispersions may also be used as finish coats to give uniform gloss and grease-resistance. Gaskets of paper, asbestos, or other fibrous material may be treated with these dispersions to bind surface fibers and to prevent disintegration of the gasket unit. The mixed dispersions may be applied by dipping, spraying, brushing, roller-coating, etc.

Another type of use is in the beater sizing of paper. The resulting sheet has excellent ageing properties and can be directly lacquered with excellent adhesion of the lacquer coat to the paper.

We claim:

1. An aqueous poly-disperse system having in the disperse phase discrete particles containing rubber and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble carbamide-aldehyde-alcohol condensate.

2. An aqueous poly-disperse system having in the disperse phase discrete particles containing rubber and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

3. An aqueous poly-disperse system having in the disperse phase rubber latex particles and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble carbamide-aldehyde-alcohol condensate.

4. An aqueous poly-disperse system having in the disperse phase rubber latex particles and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

5. An aqueous poly-disperse system having in the disperse phase rubber vulcanized latex particles and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble carbamide-aldehyde-alcohol condensate.

6. An aqueous poly-disperse system having in the disperse phase rubber vulcanized latex particles and separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

7. An aqueous poly-disperse system having in the disperse phase from two to forty parts by weight of discrete particles containing rubber and from 98 to 60 parts by weight of separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble carbamide-aldehyde-alcohol condensate.

8. An aqueous poly-disperse system having in the disperse phase from two to forty parts by weight of discrete particles containing rubber and from 98 to 60 parts by weight of separate particles of a homogeneous, heat-nonconvertible, flexible, highly condensed and polymerized plastic mass with limited thermoplasticity which comprises the reaction product obtained by simultaneously working and heating between about 120° C. and about 180° C. an oil-modified alkyd resin and an organic solvent-soluble urea-formaldehyde-alcohol condensate.

9. The poly-disperse system of claim 8 in which the alcohol of the urea-formaldehyde-alcohol condensate is monohydric.

10. An aqueous poly-disperse system having in the disperse phase from two to forty parts by weight of vulcanized rubber latex particles and from 98 to 60 parts of separate particles of a homogeneous, heat-nonconvertible, flexible, highly condensed and polymerized plastic mass with limited thermoplasticity which comprises the reaction product obtained by simultaneously working and heating between about 120° C. and about 180 C. an oil-modified alkyd resin and an organic solvent-soluble urea-formaldehyde-alcohol condensate.

11. The poly-disperse system of claim 10 in which the alcohol of the urea-formaldehyde-alcohol condensate is monohydric.

JACK D. ROBINSON.
FREDERICK J. MYERS.